Figure 1:
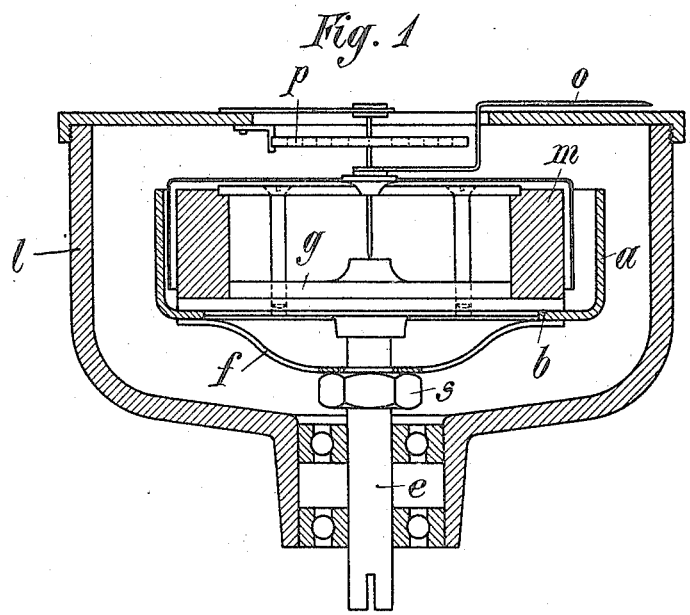

W. BECKMANN.
EDDY CURRENT TACHOMETER.
APPLICATION FILED APR. 22, 1915.

1,202,778.

Patented Oct. 31, 1916.
2 SHEETS—SHEET 1.

Inventor:
Wilhelm Beckmann
By
Attorney.

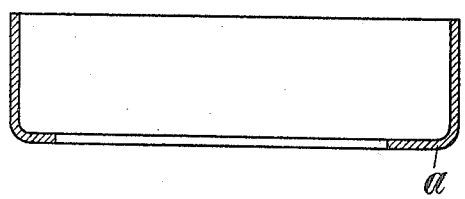
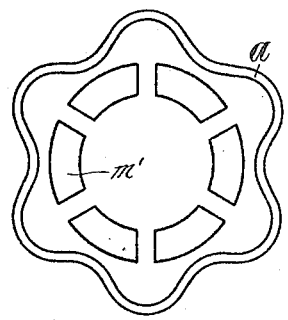
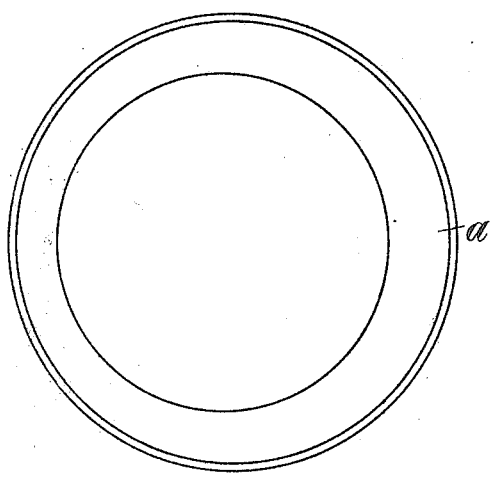
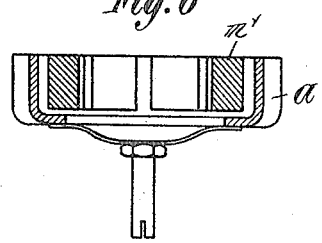
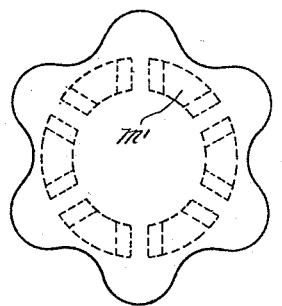

UNITED STATES PATENT OFFICE.

WILHELM BECKMANN, OF BERLIN, GERMANY.

EDDY-CURRENT TACHOMETER.

1,202,778.  Specification of Letters Patent.  Patented Oct. 31, 1916.

Original application filed March 31, 1914, Serial No. 828,607. Divided and this application filed April 22, 1915. Serial No. 23,086.

*To all whom it may concern:*

Be it known that I, WILHELM BECKMANN, engineer, subject of the King of Prussia, residing at Berlin, Germany, 5 Fontanepromenade, have invented certain new and useful Improvements in Eddy-Current Tachometers, of which the following is a specification, said invention being a divisional part of the application 828,607, filed March 31, 1914, which priority is hereby claimed for the present application.

The present invention relates to an eddy-current tachometer with iron return path body, revolving together with the revolving magnetic system.

One construction of this tachometer is described in the U. S. patent application 828607.

The action of eddy-current tachometers depends on the principle that by means of a magnet or magnets revolving at the speed to be measured an indicator body is forced contrary to the action of a spring by the eddy-currents produced. The stroke of the said indicator body serves as the means for gaging the speed to be measured. For increasing the magnetic effect an iron return path body is generally arranged on the side of the indicator body which is opposite to the magnet, the said iron return path body being arranged to revolve with the magnet. By varying the position of this iron return path body it is possible to vary the torque produced by the permanent magnet and thereby also the stroke of the indicator. The means which have, heretofore, been employed for the purpose were based either on the position of the iron return path body relatively to the magnet being varied by screw-adjustment, or on the said body being in itself subjected to a variation, without its relative position to the magnet undergoing any change, so as to intensify or reduce the field of the lines of force according to requirement. So, for example, with a bell-shaped magnet the iron return path body is introduced more or less deeply into or over the said magnet, or the said iron return path body is formed of two soft iron sleeves provided with small windows and rotatable relatively to each other. With this latter form the field is varied correspondingly to the relative registering of the said windows in the two sleeves without the iron return path body as such being varied in its relative position to the magnet. These known constructional forms, however, show considerable disadvantages, as their construction is comparatively difficult and by all means rather expensive. These disadvantages are obviated by means of the present invention. According to the present invention only a part of revolution is sufficient for obtaining a perfect adjustment.

The invention consists in giving the iron return path body such a position and shape that by turning said body the magnetic field going through the indicator body is either strengthened or weakened.

According to the invention the iron of the return path body is so distributed that its separate parts have a different radial distance from the axis of the magnet system, so that, when thus turned, the iron of said body is approached to or removed from the poles of the said magnet without any axial displacement of the said iron return body.

Figure 2:
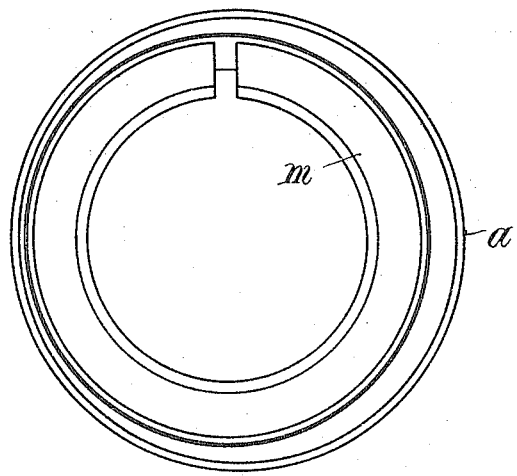

In the drawing Figure 1 shows a vertical section through a tachometer having an annular magnet and an eccentrically situated return path body. Fig. 2 shows a plan of the annular magnet in connection with an eccentrically situated return body. Fig. 3 represents the return path body in vertical section, Fig. 4 the same in plan. Fig. 5 shows the return body on using several annularly arranged magnets. Fig. 6 is a section of the arrangement shown in Fig. 5. Fig. 7 represents an iron return path body of undulated form.

In the drawing $a$ designates the iron return path body, $b$ a groove in the supporting plate $g$ of the rotating magnet $m$. Said body $a$ is also supported by a bow or ring $f$, which is preferably resilient. By tightening the nut $s$, which is screwed on the axis of the magnet $e$, the iron return path body is securely held in position, so that it cannot change its position while the tachometer is working. The elasticity of the bow or spring $f$ furthermore affords a safety lock for the fixing nut $s$.

$l$ is the casing, $o$ is the indicator and $p$ is the spring of the tachometer, which spring is secured, at one end, to the spindle of the indicator, at its other end, to the casing. In this constructional form the iron return path body is made of a cylindrical shape and is eccentrically arranged around the magnet system. By turning the iron return path body around the axis of the magnet the mass of iron opposite to the magnet poles can be approached to the latter or removed farther therefrom, whereby a correspondingly larger or shorter stroke of the indicator is obtained. The rotation of the iron return path body is made possible, by loosening the nut $s$ and thereby relieving the pressure of the spring bow $f$ on the magnet-plate $g$, so that the iron body is free to be turned to its position of adjustment.

In Fig. 5, instead of one magnet $m$, several magnets $m'$ are shown, which are annularly arranged. The arrangement is such, that the parts of the surface of the cylindrical iron return path body $a$ are at different radial distances from the axis of the magnet system. The circumference of, the iron return path body has an undulated or corrugated form corresponding to the poles of the magnet system, so that near and distant points of the iron return path body are present in the magnet system. On turning the return path body relative to the magnet system said body is brought near to, or farther away from, the poles, and the magnet field passing through the armature is strengthened or weakened according to desire.

It remains within the scope of the invention when the part moved past the poles is not only at a different distance from the poles, but is at, the same time of varying thickness and height. Further, the main idea of the invention is maintained when the height of the cylindrical iron return path body of undulated section is reduced to the thickness of a single plate, or body, as shown in Fig. 7, in which case the magnet system consisting of horse shoe magnets is carried out in a similar manner to that shown in Fig. 6. When the device becomes a heavy plate or body, as in Fig. 7, the varying thickness of the body determines the strength of the magnet field.

I claim:

1. An eddy current tachometer with iron return path body revolving together with the magnet system, the said iron return path body adapted to be turned around the axis of the magnet system, and so arranged relatively to the magnet system, that, when thus turned, the iron of said body is approached to or removed from the poles of the said magnet system, without any axial displacement of the said iron return path body.

2. An eddy current tachometer comprising in combination magnets adapted to revolve, and an iron return path body of cylindrical form arranged around said magnets and adapted to be rotated therearound, substantially as set forth.

3. An eddy current tachometer, comprising in combination a magnet system, consisting of several magnets arranged in a ring and adapted to revolve, and an iron return path cylindrical body having an undulated surface form surrounding said magnets, substantially as and for the purpose set forth.

4. An eddy current tachometer comprising in combination a magnet system adapted to revolve, and an iron return path element consisting of a body having an undulated surface, substantially as set forth.

In testimony whereof I have affixed my signature in presence of two witnesses.

WILHELM BECKMANN.

Witnesses:
FRITZ VAN DER WÓNDE,
HANS HÜBLER.